Jan. 10, 1933.    B. D. ENLUND    1,893,700

METHOD OF DETERMINING THE CONTENTS OF A FOREIGN SUBSTANCE

Filed March 5, 1929

INVENTOR.
BROR DAVID ENLUND.
BY
ATTORNEY

Patented Jan. 10, 1933

1,893,700

UNITED STATES PATENT OFFICE

BROR DAVID ENLUND, OF DEGERFORS, SWEDEN, ASSIGNOR TO HENNING ENLUND, OF BINGHAMTON, NEW YORK

METHOD OF DETERMINING THE CONTENTS OF A FOREIGN SUBSTANCE

Application filed March 5, 1929. Serial No 344,361.

The primary object of my invention is to provide a method for determining the content of a foreign substance, such as for instance silicon, in iron and steel, by measuring the specific electric resistance of the same.

Another object is to provide such a method which is readily adaptable for use both at the furnaces or point of manufacture as well as in the laboratories and places of use. By my improved method, the percentage content of foreign substances, as for instance silicon, in iron and steel may be determined readily and quickly without the necessity of mathematical calculations, thus making it possible to rapidly test the material for such percentages and to do so with relatively unskilled labor.

Included in my invention is the use of an especially prepared chart upon which can be read the percentage of the substance tested for in direct comparison with the specific electric resistance reading.

My improved method is based on the fact that there is a direct relation between the specific electric resistance in iron and steel, to the percentage of certain foreign substances in a solid solution therein, such as for instance silicon. I accomplish my purpose by first the measurement of the specific electric resistance in a test bar of a given grade of iron or steel, and with this measurement and by the use of an especially plotted chart, prepared for instance by measuring the specific electric resistance of the given grade of steel or iron having exactly known contents of all elements, and particularly the exact percentage content of the foreign substances in solution for which the chart is being made, I am able to read directly from this chart the percentage of the foreign substance tested for. Naturally, charts are prepared for each foreign substance in a given grade of iron and steel, the percentage content of which it may be desired to ascertain. These charts obviously are prepared with a view of eliminating necessity for mathematical calculations in order that accurate readings may be made quickly by an unskilled operator.

Referring now to the figures of the accompanying drawing forming a part of this application and wherein like reference numerals indicate like parts:—

Figure 1:
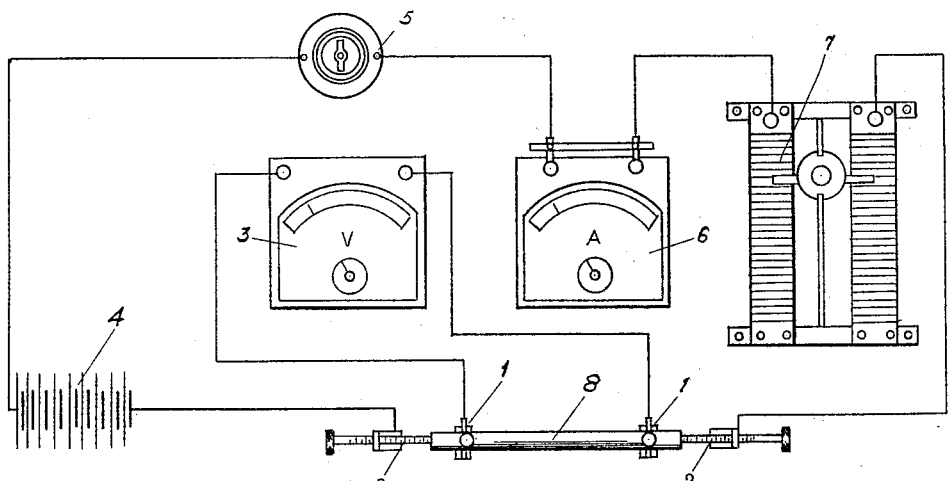
Figure 1 is a diagrammatic view illustrating a form of apparatus for measuring the specific electric resistance of the material to be tested.
Figure 2:
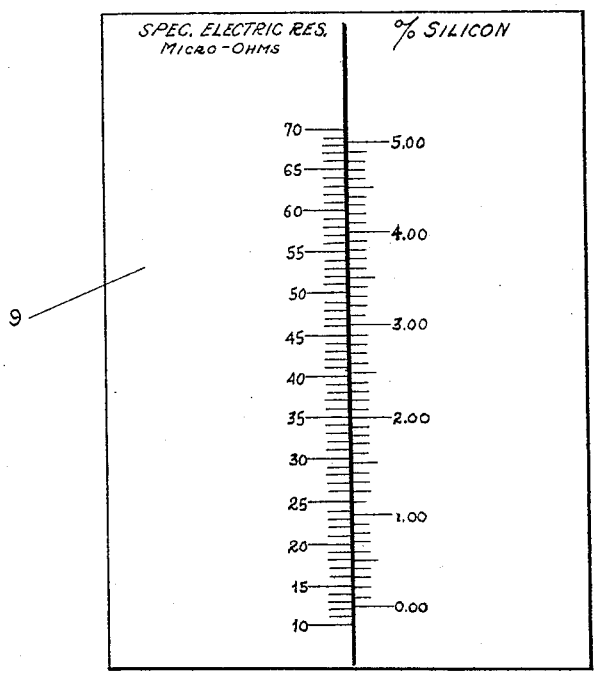
Figure 2 is a plan view of a chart used in connection with the resistance measuring apparatus and upon which can be read the percentage of silicon content of the material to be tested, in direct relation to the specific electric resistance values.

It should be stated at the outset that if in iron or steel a foreign substance or substances are included in varying percentages, the specific electric resistance of the material will necessarily vary with the percentages of such foreign substance or substances. Obviously, therefore, if these foreign substances give to the material different properties when such substances are present in greater or less percentages, it is obvious that those changes in properties of the material are in a more or less degree directly in relation to the percentages of such foreign substances and accordingly can be measured by the varying specific electric resistance of the material.

I will now describe my invention in connection with the determination of the percentage of silicon in steel, this being illustrative of the wide application of my invention.

In carrying out my method for determining the silicon content in steel, a length of steel is taken of a suitable cross section, limited only by the size of the apparatus used for making the measurements. If the testing method is to be performed at the furnace, this length of test bar may be directly cast, or cast and rolled or forged to the desired size. If the measurement is to be made at the laboratory, it may be cut from stock.

This test bar is now placed in suitable clamps 1, where it is supported for engagement at either end with contact members 2, engageable with such ends. The clamps 1 are also contact members and included in the circuit with them is a voltmeter 3. The contacts 2 lie in a circuit which includes a source of current such as a battery 4, switch 5, an ampere-meter 6 and one or more rheostats 7.

With the test bar now supported in the clamps 1 and the contacts 2 engaging the ends thereof, the switch 5 is closed, allowing the current from the battery 4 to pass through the test bar and register upon the voltmeter and amperemeter, readings from which the specific electric resistance of the test bar in micro-ohms can be readily and directly computed. The test bar is indicated in Figure 1 at 8.

It should be here stated that the particular apparatus for measuring the specific electric resistance of these test bars forms no part of this invention as many forms of apparatus may be substituted for that shown. In fact, any suitable electric resistance measuring apparatus may be employed in carrying out my invention.

Now having the specific electric resistance measurement of the test bar, it is necessary for the operator but to note the measurement on the chart 9 and read directly from such chart the percentage of silicon corresponding to such specific electric resistance measurement. It will be noted that the chart 9 is provided with graduations of specific electric resistance units and with corresponding graduations showing silicon percentages. It will be understood of course that other types and forms of charts than that herein shown may be prepared to accomplish the same purpose. The one illustrated, however, is a very simple form by means of which the percentage of foreign substances in the material to be tested can be quickly and accurately read once the specific electric resistance of the material is measured.

By my improved method, the makers of steel can quickly and easily gauge accurately the quality of the product. Likewise, the purchaser or user of steels can similarly and very quickly check up by the same method and determine if the delivered material is according to specifications as ordered.

Obviously, many changes may be made by way of detail in the form and method of my invention without departing from the spirit and scope thereof. I do not limit myself, therefore, to the form shown and described herein other than by the appended claims.

I claim:

1. The method of determining the percentage of a foreign substance in iron and steel, comprising the steps of measuring, in the absence of any chemical reaction within the material, the electric resistance of a test piece of the material to be tested and comparing such measurement with a prepared chart of known factors.

2. The method of determining the percentage of a foreign substance in iron and steel, comprising the steps of measuring the electric resistance of a test piece of the material to be tested, the constituents of which are in solid solution and comparing such measurement with indications on a prepared chart from which can be read directly the percentage of such foreign substance for such measurement.

3. The method of determining the percentage of silicon content in iron and steel, comprising the steps of measuring, in the absence of any chemical reaction within the material, the electric resistance of a test piece to be tested and comparing such measurement with indications on a prepared chart from which can be read directly the percentage of silicon for such measurement.

In testimony whereof I affix my signature.

BROR DAVID ENLUND.